United States Patent
Saltchev et al.

(10) Patent No.: US 6,535,208 B1
(45) Date of Patent: Mar. 18, 2003

(54) METHOD AND APPARATUS FOR LOCKING A PLURALITY OF DISPLAY SYNCHRONIZATION SIGNALS

(75) Inventors: Roumen Saltchev, Markham (CA); Edward G. Callway, Toronto (CA); Zemin Liu, Scarborough (CA); Jian-Cheng Zheng, Scarborough (CA)

(73) Assignee: Ati International Srl, Barbados (KN)

( * ) Notice: Subject to any disclaimer, the term of this patent is extended or adjusted under 35 U.S.C. 154(b) by 160 days.

(21) Appl. No.: 09/654,671

(22) Filed: Sep. 5, 2000

(51) Int. Cl.$^7$ .................................................. G09G 5/00
(52) U.S. Cl. ........................ 345/213; 345/211; 345/212
(58) Field of Search ................................. 345/211, 212, 345/213, 1.1, 2.1, 2.2, 3.2

(56) References Cited

U.S. PATENT DOCUMENTS

| | | | |
|---|---|---|---|
| 5,781,185 A | * 7/1998 | Shin | 345/213 |
| 5,943,064 A | 8/1999 | Hong | |
| 5,966,119 A | * 10/1999 | Hwang | 345/213 |
| 6,104,414 A | * 8/2000 | Odryna et al. | 345/509 |
| 6,169,533 B1 | * 1/2001 | Tse | 345/115 |
| 6,262,695 B1 | * 7/2001 | McGowan | 345/1 |

* cited by examiner

Primary Examiner—Richard Hjerpe
Assistant Examiner—Kimnhung Nguyen
(74) Attorney, Agent, or Firm—Vedder, Price, Kaufman & Kammholz

(57) ABSTRACT

A method and apparatus locks a plurality of display synchronization signals, such as horizontal synchronization signals and a vertical synchronization signals, from a plurality of display output devices, such as a plurality of graphics processors. The method and apparatus digitally adjusts a vertical synchronization signal associated with a first display output device, with respect to a vertical synchronization signal associated with a second graphic output device until a crossover is detected between the first and second vertical synchronization signals. This provides a type of coarse synchronization. In response to detection of the first crossover, the method and apparatus digitally adjusts a horizontal synchronization signal associated with the first display output device with respect to a horizontal synchronization signal associated with the second display device to align the synchronization signals. The adjustment of the horizontal synchronization signals provides a fine synchronization adjustment.

25 Claims, 3 Drawing Sheets

METHOD AND APPARATUS FOR LOCKING A PLURALITY OF DISPLAY SYNCHRONIZATION SIGNALS

RELATED CO-PENDING APPLICATION

This application is a related application to co-pending application entitled "Method and Apparatus for Rendering Video" having Ser. No. 9/333,736, filed on Jun. 15, 1999 by Edward Callway, assigned to instant assignee and hereby incorporated in its entirety by reference.

FIELD OF THE INVENTION

The invention relates generally to methods and apparatus for synchronizing display synchronization signals, and more particularly to methods and apparatus for locking a plurality of display synchronization signals among a plurality of display output devices that are outputting display data to a common display device.

BACKGROUND OF THE INVENTION

Parallel graphics processing systems are known. For example, a plurality of 3D processing engines may be used to render 3D images for video games or other multimedia applications. In such systems, a plurality of graphics processing chips or 3D engines may render different portions of the same image that is output to a common display device. Accordingly, synchronization of display synchronization signals, such as vertical synchronization (VSYNC) and horizontal synchronization (HSYNC) signals must be properly coordinated.

Parallel graphics processing systems may be constructed wherein one graphics chip receives a fixed clock signal from a fixed clock source and another graphics processor receives a variable clock signal from a variable clock source such as a voltage control oscillator (VCO). In such systems, upon power up, both chips attempt to output pixel data to the common display. Typically, a software or hardware based algorithm detects when horizontal and vertical synchronization signals are locked in phase between the two graphics processors. Synchronization is typically performed during normal operation to keep the VCO locked up and to cancel drift. In addition, systems that employ the voltage control oscillator use a charge pump, such as an analog charging circuit, to suitably vary the voltage controlled oscillator to vary the variable clock source to one of the graphics processor to synchronize its vertical synchronization signal and horizontal synchronization with the other graphics processing chip. However, a problem arises since such analog circuits can have long response times and can take up large amounts of integrated circuit space and discrete VCO circuits are expensive. With higher frequency graphics engines and display devices, such systems typically are not properly synchronized. In addition, the voltage control oscillator which is varied through the charge pump, also adjusts other clocks associated with the graphics processor. Since these clocks are being adjusted constantly, the graphics processor whose clock input is a variable clock input has an unstable graphics processing engine which can cause a jitter effect for output images.

Accordingly, it would be desirable to have a method and apparatus for suitably locking a plurality of display synchronization signals among a plurality of display output devices, such as graphics processors, to provide improved image quality at a reduced cost.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a method and apparatus locks a plurality of display synchronization signals, such as horizontal synchronization signals and vertical synchronization signals, from a plurality of display output devices, such as a plurality of graphics processors. The method and apparatus digitally adjusts a vertical synchronization signal associated with a first display output device, with respect to a vertical synchronization signal associated with a second graphic output device until a crossover is detected between the first and second vertical synchronization signals. This provides a type of coarse synchronization. In response to detection of the first crossover, the method and apparatus digitally adjusts a horizontal synchronization signal associated with the first display output device with respect to a horizontal synchronization signal associated with the second display device to align the synchronization signals. The adjustment of the horizontal synchronization signals provides a fine synchronization adjustment.

In one embodiment, the synchronization of the vertical synchronization signals is performed by adjusting a line width portion of the vertical synchronization signals. Accordingly, a charge pump and associated analog circuitry is avoided and digital line width control is provided. Also, all of the display output devices are fed by a common fixed clock reference, unlike conventional systems where a variable clock is adjusted on at least one of the graphics processing devices. Accordingly, the disclosed apparatus and methods provide synchronization of horizontal and vertical display synchronization signals without adjusting a clock reference associated in any of the synchronization signals.

Figure 1:
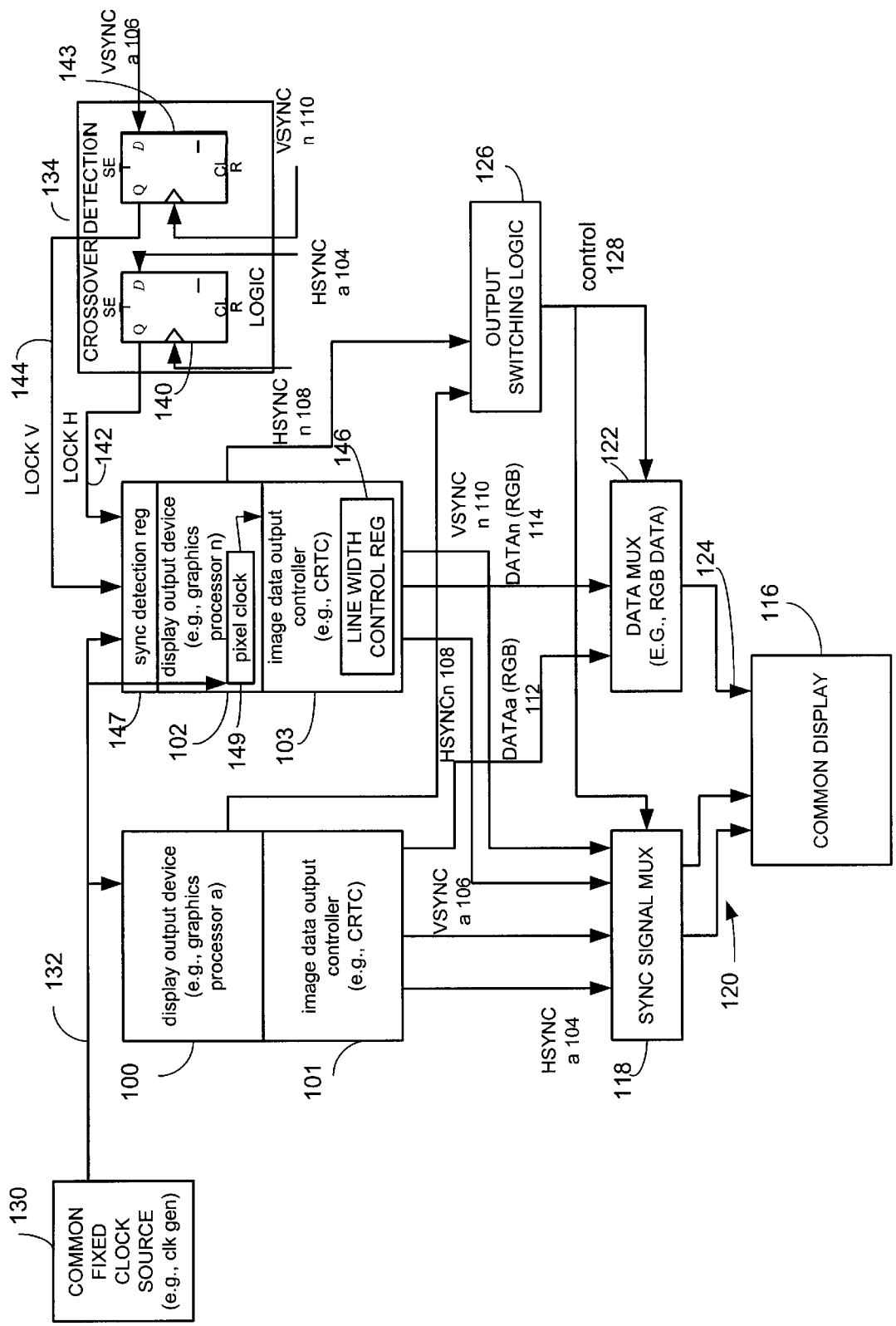
FIG. 1 is a block diagram illustrating one example of a multigraphics processor system employing an apparatus for locking display synchronizations signals in accordance with one embodiment of the invention.

FIG. 1 illustrates a multigraphics processor arrangement that includes a first display output device 100, such as a 3D graphics processor or any other suitable display output device, and a second display output device 102 such as another 3D graphics processor or any other suitable display output device. Each of the first display output device 100 and the second display output device 102 output display synchronization signals 104, 106, 108 and 110. In this example, the display synchronization signals 104 and 108 are horizontal synchronization signals and display synchronization signals 106 and 110 are vertical synchronization signals. Each of the display output devices 100 and 102 also output pixel data 112 and 114, respectively, which is data for output to a common display 116. As with conventional multigraphics processing systems, a synchronization signal multiplexer 118 receives the display synchronization signals 104–110 and outputs the suitable synchronization signal pair 120 (e.g., HSYNC and VSYNC) to the display device 116 depending upon which graphics processor is supplying the pixel data. Similarly, a data multiplexer 122 outputs pixel data such as in the form of RGB data, or any other suitable form, from the graphics processor which is to be displayed on the common display device 116. Accordingly, the data multiplexer 122 outputs pixel data 124 from one of the two graphics processors under control of switching logic 126 through control signal bus 128.

A common fixed clock reference source 130 is operatively coupled to the display output devices 100 and 102 to provide a fixed clock reference signal 132. The display synchronization signals 104, 106, 108 and 110 are based on the common fixed clock reference 132.

Each of the display output devices 100 and 102 include an image data output controller 101 and 103, respectively, such as CRT controllers as known in the art and associated control registers.

A digital synchronization signal phase detection circuit 134 is operatively coupled to receive the display synchronization signals 104–110 and provides a phase relationship between the respective synchronization signals. By way of illustration and not limitation, the digital synchronization signal phase detection circuit 134 may be a software routine executed by the graphics processing device such as the display output device 102 or may be latches arranged as shown and associated software. For example, a first latch 140, such as an edge triggered flip flop or other suitable latching circuit, receives the horizontal synchronization signals 104 and 108 from each of the display output devices 100 and 102 and generates horizontal synchronization crossover detection data 142 indicating that a crossover of HSYNC edges has occurred. Hence, the latch 140 serves as horizontal SYNC crossover detector by detecting the crossover of edges of the horizontal synchronization signal.

In a similar manner, latch 143, such as an edge triggered flip flop or other suitable latchnig circuit, outputs vertical synchronization crossover detection data 144 in response to a crossover of edges from the vertical synchronization signal 106 and the vertical synchronization signal 110. The horizontal synchronization crossover detection data 142 and the vertical synchronization crossover detection data 144 may be, for example, one or more bits and may be stored in a suitable crossover detection register 147.

The vertical synchronization crossover detection data 144 represents a phase relationship between the vertical synchronization signals 106 and 110. Similarly, the horizontal crossover detection data 142 represents a phase relationship between the first and second horizontal synchronization signals 104 and 108.

The synchronization multiplexer 118 is operatively controlled by switching logic 126 through control bus 128 to selectively provide the appropriate vertical synchronization signal and the horizontal synchronization signal from the appropriate display output device at the appropriate time, such as on a pixel by pixel basis, page by page basis or other suitable basis. The common display device 116 displays data in response to the synchronized synchronization signals 104–110. Accordingly, once the vertical synchronization signals are synchronized between the display output devices 100 and 102 and the horizontal synchronization signals are suitably aligned among the display output devices 100 and 102, the synchronization signal multiplexer 118 is controlled to output the appropriate synchronization signals from the appropriate processor. If the synchronization signals are properly synchronized, the multiplexer 118 may be removed, if desired or used to reduce residual jitter.

Figure 2:
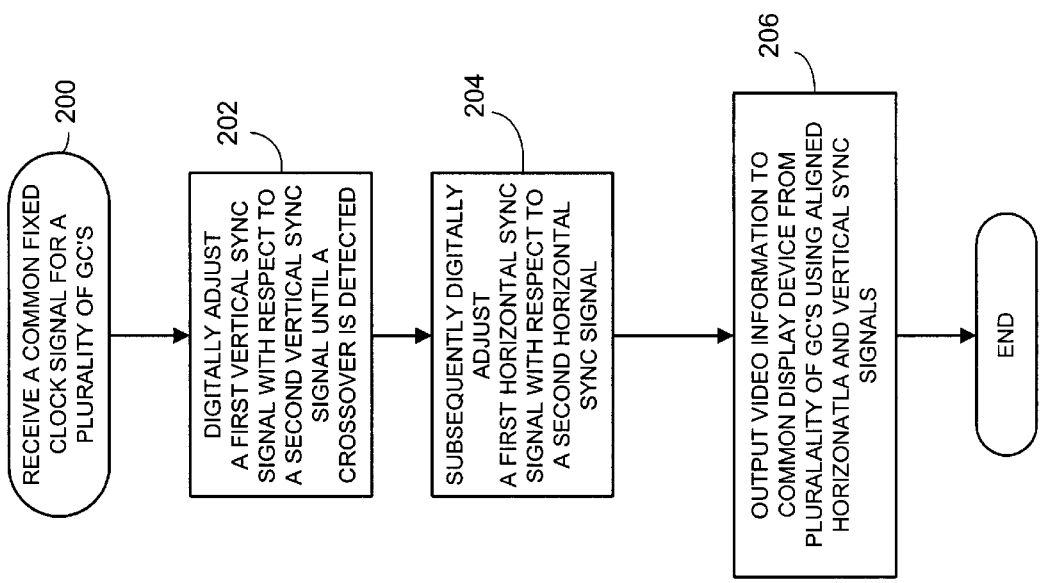
FIG. 2 is a flow chart illustrating an example of a method for locking a plurality of display synchronization signals among a plurality of display output devices according to one embodiment of the invention.

FIG. 2 illustrates a method for locking the display synchronization signals among a plurality of display output devices. As shown in block 200, the method includes receiving a fixed clock signal for the plurality of output display devices such as the graphics processor chips. This may come from, for example, the common fixed clock source 130. As shown in block 202, the method includes digitally adjusting a vertical synchronization signal of graphics output device 100 with respect to the vertical synchronization signal of the graphics output device 102 until a crossover between the vertical synchronization signals 106 and 110 is detected. For example, this may be done by adjusting a horizontal line width through the use of a line width control register 146, such as a CRTC register, H_TOTAL_CNTL, to either increase or decrease the line length of the horizontal line which effectively adjusts the vertical synchronization pulse. The crossover may be detected, for example, by using the latch 143. As shown in block 204, once the vertical synchronization crossover detection has been made, the method includes subsequently digitally adjusting the horizontal synchronization signal of each of the graphics processors until the crossover of these horizontal SYNC signals is detected. This may be carried out, for example, by adding or subtracting one period of the reference clock to each horizontal line in order to achieve fine adjustment. The crossover can be detected, for example, through the use of latch 140.

The initial digital adjustment of the vertical synchronization signals until a crossover is detected provides a coarse level of display synchronization signal level alignment. Once a coarse level is performed, the method includes subsequently digitally adjusting the horizontal synchronization signals so that they align. This is done by subsequently detecting crossover of edges of the horizontal synchronization signals by latch 140. Once the horizontal synchronization signals are detected as having crossed, the switching logic 126 controls the data multiplexer 122 and the synchronization signal multiplexer 118 to output the data and display synchronization signals from the appropriate graphics processor to output video information to the common display device 116 from the plurality of graphics processors using the aligned horizontal and vertical synchronized signals. This is shown in block 206.

Figure 3:
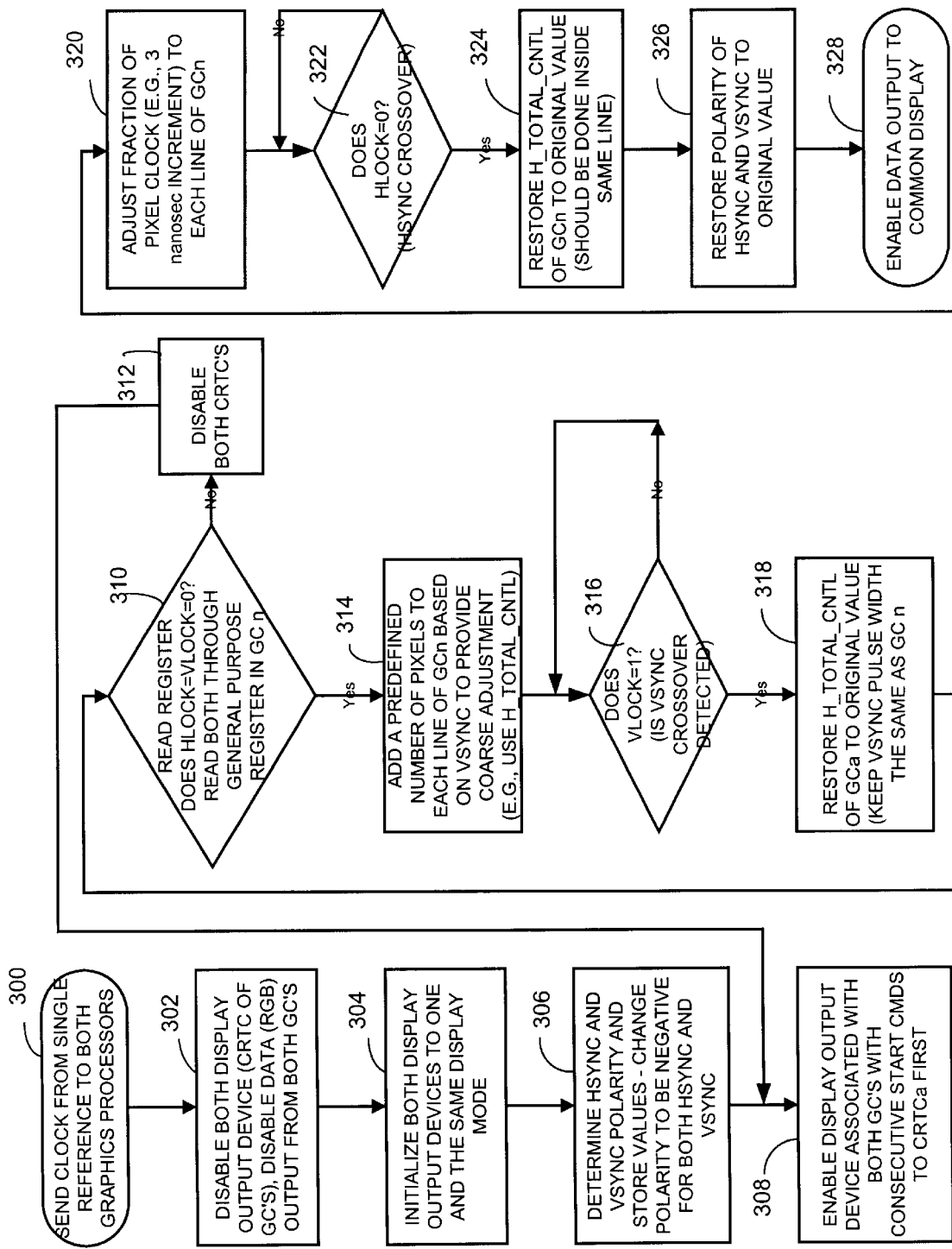
FIG. 3 is a flow chart illustrating another embodiment of a method for locking a plurality of display synchronization signals among a plurality of display output devices such as the system shown in FIG. 1.

As shown in FIG. 3, a more detailed method will be described. As shown in block 300 the method includes sending a clock signal from a common fixed clock source to both graphics display output devices. As shown in block 302, the method includes initially disabling both display output devices and disabling output from both display output devices. In this way, no display information is output to the common display device on power up. As shown in block 304, the method includes initializing both display output devices to one and the same display mode. A display mode may include, for example, a monitor or screen resolution and refresh rate which is set to be the same for both display output devices.

As shown in block 306, the method includes determining the HSYNC and VSYNC polarity to determine whether positive or negative polarity HSYNC and VSYNC is used. The polarity values are stored. The method includes changing the polarity to be negative for both HSYNC and VSYNC signals for both display output devices. This simplifies the crossover detection algorithm because a value of "0" on VLOCK and HLOCK will always mean that controller 100 is ahead of display controller 102.

As shown in block 308, the method includes enabling the image data output controllers with consecutive start commands. For example, image output data controller 101 may receive a start command first. As shown in block 310, the method includes initially checking the lock register (sycn detection register) 147 to determine whether the horizontal signals are locked and the vertical signals are locked. The sync detection register 147 may be a general purpose register associated with each of the display output device although only one display output device is shown as having such a register in the drawings.

If the horizontal and vertical synchronization signals are not locked, the process continues to block 314 where the method includes adding a predefined number of pixels (either positive or negative number of pixels for either display output device) to each line of the display output device 102. For example pixels can be added to each line or all lines to give a coarse adjustment. The predetermined number of pixels may be determined empirically apriori so that the amount is coarse enough not to take a long time before the VSYNCS crossover. Accordingly, the horizontal line length is changed using the line width control register 146 to vary the phase of the VSYNC signal 110 of the display output device 102 with respect to the VSYNC 106 from display output device 100.

Referring back to block 310, if the value of the synchronization detection registers (H lock and V lock registers) indicate that the horizontal and vertical synchronization signals are locked with respect to one another, the method includes disabling both CRTCs as shown in block 312 and then re-enabling the CRTC associated with the display output devices. Referring back to block 314, the method includes determining whether a vertical SYNC crossover is detected. This may be done, for example, by evaluating the synchronization detection register 146 to determine whether V lock=1. If the vertical sync crossover is detected, then the coarse synchronization is complete. The process then continues to block 318 where the method includes restoring the line length to its original value where the display output device 100. Accordingly, digital line length adjustment that occurred during the coarse adjustment to align the vertical synchronization signals is set to its original value.

As shown in block 320, the method includes adding (or subtracting) an incremental amount of pixels (e.g., whole pixels or fractions of pixels) to each line of the other display output device (i.e., display output device 102) to again vary the horizontal line width to provide fine synchronization by synchronizing the horizontal synchronization signals. This may be done by adjusting a pixel clock 149 (e.g., internal to display output device 102) or other reference clock on a subpixel increment basis and adjusting the HSYNC signal accordingly, such as by the image data controller 103. As shown in block 322, the method includes evaluating the crossover detection data to determine whether a crossover has occurred between the two horizontal synchronization signals. This may be done, for example, by evaluating the value of the H lock register to see if it is equal to zero indicating that a crossover has been detected by the latch 140. If so, the method includes restoring the line length of the second display output device to its original value. As shown in block 326, the method includes restoring the polarity of the horizontal synchronization signal and the vertical synchronization signal value to its original polarity. As shown in block 328, the method then includes outputting video information to the common display device from each of the first and second display output devices using the line synchronization signals obtained from digitally aligned horizontal and vertical synchronization signals from the plurality of display output devices.

Referring again to FIG. 1, the crossover detection logic 134 may be incorporated as latches within a display output device or may be in another suitable logic block. The display output device 102 is suitably programmed to act as digital synchronization alignment logic to digitally control variation of a line width associated with the synchronization signals to align both the horizontal display synchronization signals and the vertical synchronization signals without adjusting a clock reference associated with either of the first and second synchronization signals. For example, in one embodiment, a host CPU or the display output device 102 may be programmed to read sync detection register 147 and update the content of line width control register 146 to digitally vary the line width. The horizontal line width is digitally adjusted to align both horizontal synchronization signals from different sources, and vertical synchronization signals from different sources. Vertical synchronization crossover detection data represents a phase relationship between the vertical synchronization signals 106 and 110. Similarly, the horizontal crossover detection data 142 represents a phase relationship between the first and second horizontal synchronization signals 104 and 108. It will also be recognized that the digital synchronization alignment logic may also be implemented in hardware or any suitable combination of hardware and software if desired.

In an alternative embodiment, in addition to providing display synchronization in response to a power up condition, the disclosed method and apparatus also can perform synchronization upon detection of a change in display mode selection. Accordingly, if a graphic user interface or any other suitable interface changes the resolution required, the disclosed digital adjustment occurs to suitably synchronize display synchronization signals from a body of sources. In operation, a display mode register is periodically evaluated to determine whether or not a change has occurred. Alternatively, an interrupt driven procedure may be implemented where an interrupt is generated upon a display mode change, thereby initializing the synchronization procedure described herein.

It will also be recognized by one of ordinary skill in the art that although the invention has been described by way of illustration, and not limitation, with respect to two sets of synchronization signals, namely a first set including a horizontal synchronization signal and a vertical synchronization signal, and a second set of horizontal and vertical signals, the invention may be also suitably applied to any pair of signals that require synchronization.

It should be understood that the implementation of other variations and modifications of the invention in its various aspects will be apparent to those of ordinary skill in the art, and that the invention is not limited by the specific embodiments described. For example, it will be recognized that more than two display device may be synchronized using the above disclosed synchronization techniques. For example, it will be recognized that more than two display output devices may be synchronized using the above disclosed synchronization techniques by extending the number of inputs on blocks 118 and 122 and/or cross over detection logic for each display output device. Also, synchronization can be made by only varying the pixel clock and/or only looking at the vertical synchronization lock. It is therefore contemplated to cover by the present invention, any and all modifications, variations, or equivalents that fall within the spirit and scope of the basic underlying principles disclosed and claimed herein.

What is claimed is:

1. A method for locking a plurality of display synchronization signals among at least a first and second display output device operatively coupled to a common display device comprising the steps of:

(a) digitally adjusting a first vertical synchronization signal associated with the first display output device with respect to a second vertical synchronization signal associated with the second display output device until a first crossover is detected between the first and second vertical synchronization signals; and (b) in response to detection of the first crossover, digitally adjusting a first horizontal synchronization signal associated with the first display output device with respect to a second horizontal synchronization signal associated with the second display output device to align the synchronization signals.

2. The method of claim 1 wherein the step of digitally adjusting the first and second vertical synchronization signals includes adjusting a line width portion of at least one of the vertical synchronization signals.

3. The method of claim 1 including the step of receiving a common fixed clock reference from a fixed reference source operatively coupled to the first and second display output devices wherein each of the first and second display synchronization signals is based on the common fixed clock reference.

4. The method of claim 1 including the step of repeating steps (a) and (b) in response to detection of a change in display mode selection.

5. The method of claim 1 wherein the steps of (a) and (b) are performed without adjusting a clock reference associated with any of the first and second vertical synchronization signals and the first and second horizontal synchronization signals.

6. The method of claim 1 including the step of providing first crossover detection data representing a phase relationship between the first and second vertical synchronization signals.

7. The method of claim 1 including the step of providing second crossover detection data representing a phase relationship between the first and second horizontal synchronization signals.

8. The method of claim 1 including the step of outputting video information to the common display device from each the first and second display output devices using aligned synchronization signals obtained from performing steps (a) and (b).

9. Apparatus for locking display synchronization signals among at least a first and second display output device that are operatively coupleable to a common display device comprising:

the first display output device having at least a first display synchronization signal;

the second display output device having at least a second display synchronization signal;

a digital synchronization signal phase detection circuit operatively coupled to receive the first and second display synchronization signals operative to provide a phase relationship between the first and second synchronization signals; and digital synchronization alignment logic operative to digitally control variation of a line width associated with the first synchronization signal to align both the first and second display synchronization signals without adjusting a clock reference associated with either of the first and second synchronization signals.

10. The apparatus of claim 9 including a common fixed clock reference source operatively coupled to the first and second display output devices wherein each of the first and second display synchronization signals is based on the common fixed clock reference.

11. The apparatus of claim 9 wherein the first synchronization signal includes a first vertical synchronization signal associated with a first display output device and wherein the second synchronization signal includes a vertical synchronization signal associated with the second display output device.

12. The apparatus of claim 9 wherein the digital synchronization signal phase detection circuit includes a crossover detection circuit operatively coupled to produce a crossover detection data in response to latching the first and second synchronization signals.

13. The apparatus of claim 11 wherein the digital synchronization signal phase detection circuit includes a first crossover detection circuit operatively responsive to the first and second vertical synchronization signals and to produce vertical sync crossover detection data, and a second crossover detection circuit operatively responsive to the first and second horizontal synchronization signals to produce horizontal sync crossover detection data.

14. The apparatus of claim 9 including a multiplexing circuit operatively coupled to selectively provide the first vertical sync signal and the first horizontal sync signal to the common display device in response to synchronizing the synchronization signals or selectively provide a second vertical synchronization signal and a second horizontal synchronization signal from the second display output device.

15. The apparatus of claim 13 wherein the vertical sync crossover detection data represents a phase relationship between the first and second vertical synchronization signals.

16. The apparatus of claim 13 wherein the horizontal crossover detection data represent a phase relationship between the first and second horizontal synchronization signals.

17. The apparatus of claim 13 wherein the digital synchronization alignment logic digitally controls variation of a line width associated with the first synchronization signal to align based on the horizontal or vertical crossover detection data.

18. The apparatus of claim 9 including a CRTC register and wherein the line width is adjusted by modifying content of the CRTC register.

19. A method for locking a plurality of display synchronization signals among at least a first and second display output device operatively coupled to a common display device comprising the steps of:

(a) digitally adjusting a first vertical synchronization signal associated with the first display output device with respect to a second vertical synchronization signal associated with the second display output device until a first crossover is detected between the first and second vertical synchronization signals by adjusting a line width portion of at least one of the vertical synchronization signals; and (b) in response to detection of the first crossover, digitally adjusting a first horizontal synchronization signal associated with the first display output device with respect to a second horizontal synchronization signal associated with the second display output device to align the synchronization signals.

20. The method of claim 19 including the step of receiving a common fixed clock reference from a fixed reference source operatively coupled to the first and second display output devices wherein each of the first and second display synchronization signals is based on the common fixed clock reference.

21. The method of claim 20 including the step of repeating steps (a) and (b) in response to detection of a change in display mode selection.

22. The method of claim 19 wherein the steps of (a) and (b) are performed without adjusting a clock reference associated with any of the first and second vertical synchronization signals and the first and second horizontal synchronization signals.

23. The method of claim 22 including the step of providing first crossover detection data representing a phase relationship between the first and second vertical synchronization signals.

24. The method of claim 23 including the step of providing second crossover detection data representing a phase relationship between the first and second horizontal synchronization signals.

25. The method of claim 24 including the step of outputting video information to the common display device from each the first and second display output devices using aligned synchronization signals obtained from performing steps (a) and (b).

* * * * *